June 9, 1959 E. O. DRYER 2,889,853
QUICK CHANGE LINE BLIND
Filed Feb. 23, 1954 2 Sheets-Sheet 1
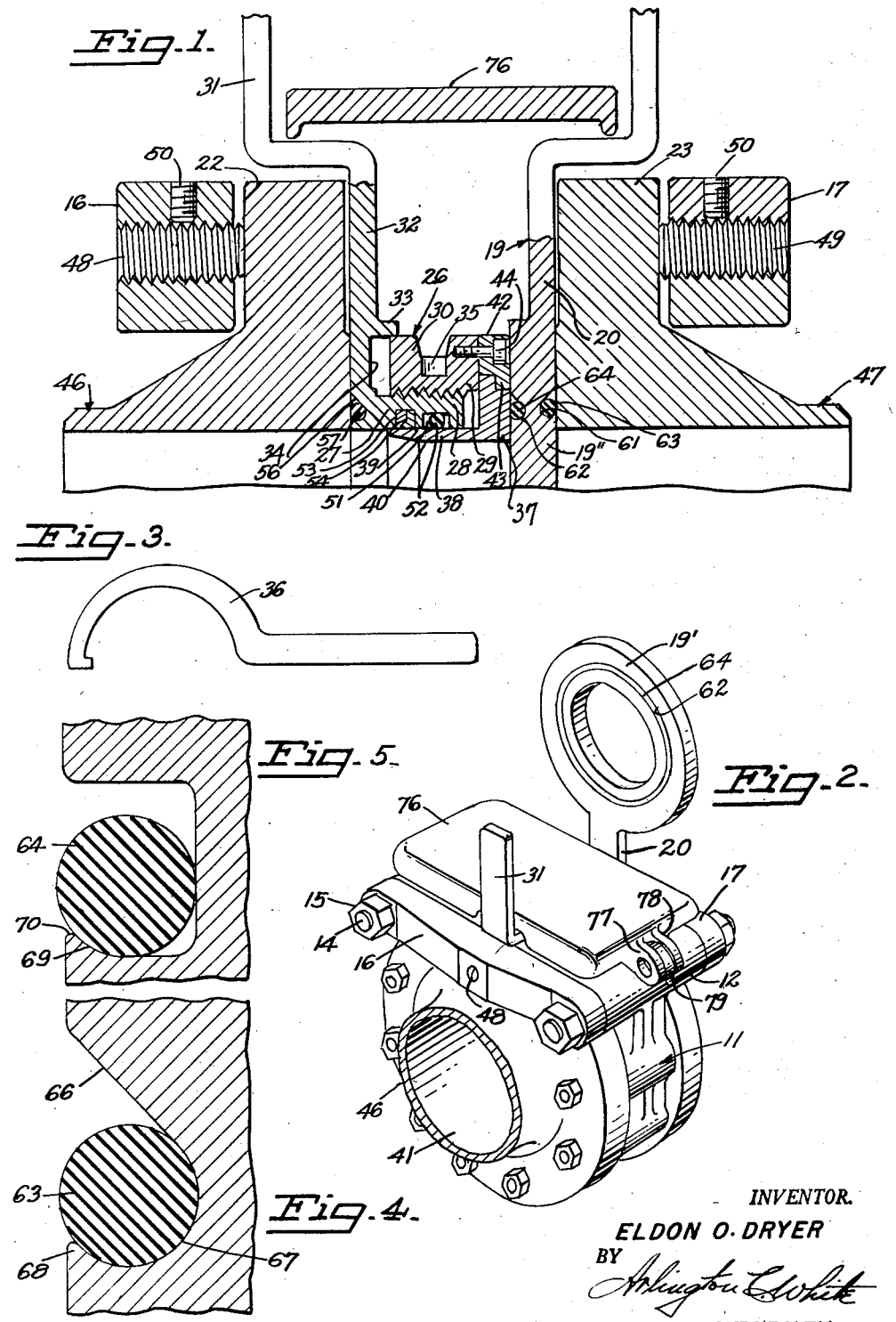
INVENTOR.
ELDON O. DRYER
BY
ATTORNEY

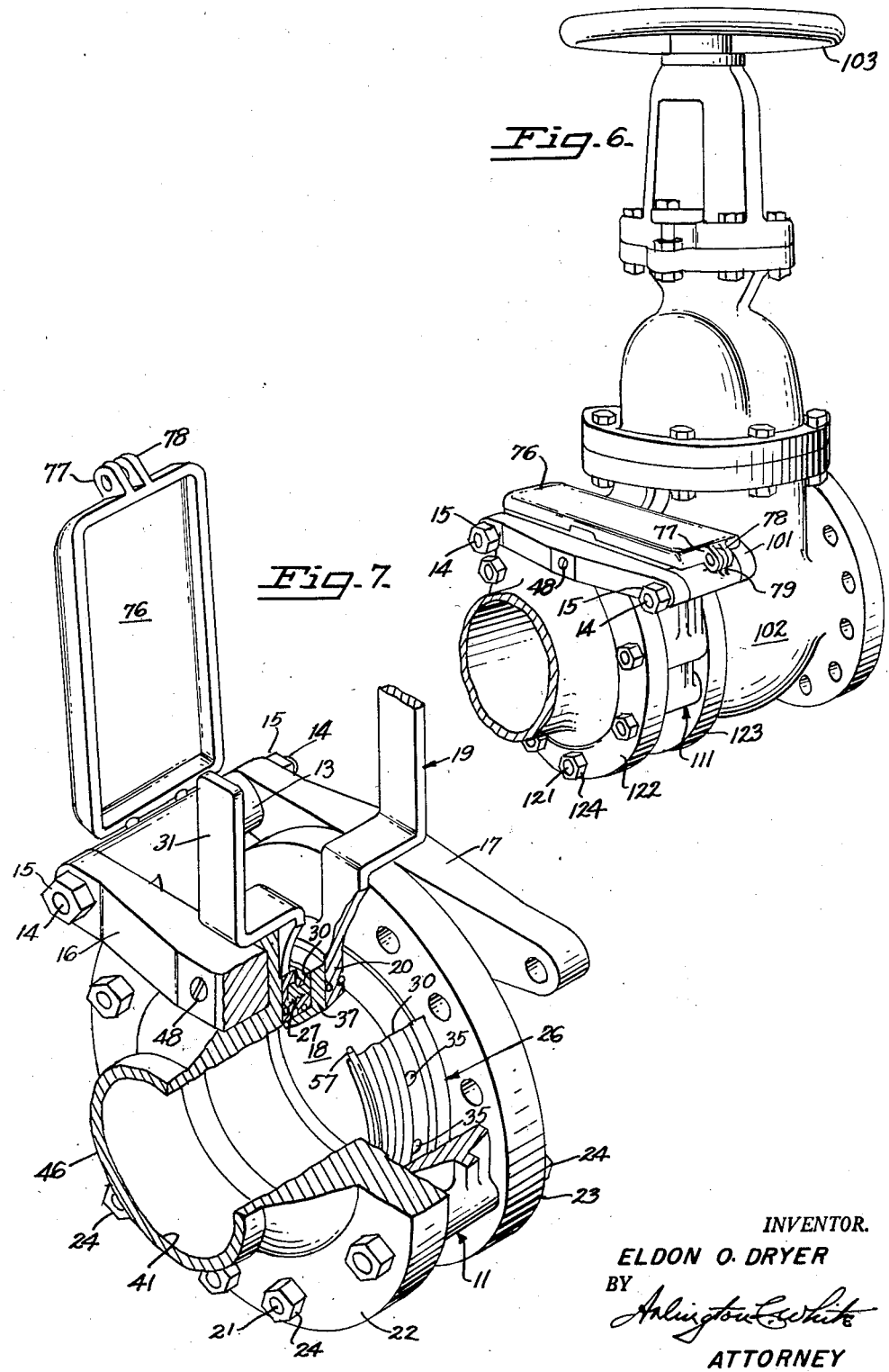

United States Patent Office 2,889,853
Patented June 9, 1959

2,889,853

QUICK CHANGE LINE BLIND

Eldon O. Dryer, Oakland, Calif.

Application February 23, 1954, Serial No. 412,001

10 Claims. (Cl. 138—94.3)

The invention, in general, relates to means for controlling the flow of fluids in a pipe-line or like conduit. More particularly, the invention relates to an improved combination of a line blind and an expanding insert assembly for positively shutting off fluid flow under effective seal against leakage.

Heretofore in the art there have been devised two general types of line blinds for shutting off fluid flow in pipe-lines. One such type comprises a plate and gaskets inserted and bolted between two companion pipe-line flanges which, as is well known, requires considerable time and labor to change and changes must be effected by mechanics rather than the usual pipe-line operator. Moreover, due to wear, and erosion, as well as distortions due to expansion and contraction under variable temperature conditions, this type of blind quickly develops leaks with attendant fire hazards. The other general type of blind comprises a combination valve-blind unit which, although affording quick change from full flow to shut-off, and vice versa, is of complex construction, intricate and of expensive construction requiring considerable maintenance. The present invention is directed to the provision of an inexpensively produced and maintained line blind assembly having all the advantages of quick change blinds and affording a more positive shut-off and seal than blinds heretofore marketed and in use.

A primary object of my invention is to provide a combination line blind and expanding insert assembly for controlling fluid flow in pipe-lines and the like under effective seal against leakage.

Another important object of the present invention is to provide an improved combination line blind and expanding insert assembly of the indicated nature which is additionally characterized by its facile operability to afford quick changes from full shut-off under effective seal to full unrestricted fluid flow within a minimum of time and labor effort.

A still further object of my invention is to provide a combined line blind and expanding insert assembly of the aforementioned character which is comparatively inexpensive to manufacture, which has appreciably increased durability, and which maintains effective seal against fluid leakage under relatively high line pressure.

Another object of my present invention is to provide a combined line blind and expanding insert assembly which is substantially free from rust or erosion or damage from dirt or debris or other foreign material.

Other objects of the invention, together with some of the advantageous features thereof, will appear from the following description of a preferred and a modified embodiment of the invention which are illustrated in the accompanying drawings. It is to be understood that I am not to be limited to the precise embodiments shown, nor to the precise arrangement of the various parts thereof, as my invention, as defined in the appended claims, can be embodied in a plurality and variety of forms.

Referring to the drawings:

Fig. 1 is an enlarged longitudinal upper sectional view in closed position of a preferred embodiment of the invention, as applied to companion pipe-line flanges on adjacent pipe-line sections.

Fig. 2 is an isometric perspective view of a preferred embodiment of the invention, with cover plate in closed position.

Fig. 3 is a side elevational view of a wrench usable for operating the expanding insert assembly of the preferred embodiment of the invention.

Fig. 4 is an enlarged detail of a preferred O ring groove and O ring employed for sealing at mating surfaces of the preferred embodiment of the invention.

Fig. 5 is an enlarged detail of a modified embodiment of O ring groove and O ring combination.

Fig. 6 is a perspective view of a preferred embodiment of the invention, as exemplified in a valve-blind unit incorporating the invention.

Fig. 7 is an enlarged isometric perspective view in open position partly broken away to illustrate the construction and with cover plate opened, of a preferred embodiment of the invention.

In its preferred form, the quick change line blind of the present invention preferably comprises a body defining a cavity for the removable reception of a line blind; said body being adapted to be bolted to two companion enclosing flanges of pipe-line sections, an insert assembly carried by said body, together with means for expanding and contracting said assembly to exert pressure against as well as to relieve pressure upon said blind, and sealing means carried by said body and said blind for effecting positive seals against leakage between said insert assembly and said blind as well as between the mating surfaces of the two companion enclosing flanges of pipe sections of a pipe-line in which the blind is installed; said assembly being removable as a unit from said body.

As particularly illustrated in Figs. 1, 2 and 7 of the accompanying drawings, I provide in my improved quick change line blind a U-shaped body, generally designated by the reference numeral 11, which may be cast to any desired size to accommodate different sizes of pipe-lines or conduits in which it is to be installed. The body 11 integrally carries at the upper extremities of its U-section a pair of hollow cross-bars 12 and 13 by means of which, as well as bolts 14 and nuts 15, the body is removably fastened to a pair of strong-backs 16 and 17 arranged in spaced parallel relationship. The U-shaped body 11, together with the strong-backs 16 and 17, define a fixed cavity 18 for the reception of a line blind 19, preferably consisting of a specially built two-part spectacle plate, as well as an insert assembly hereinafter described, through the medium of which the pipe-line in which the body 11 is installed may be shut-off completely as to fluid flow or be opened to full fluid flow. The U-section of the U-shaped body 11 is formed with a plurality of holes for passage of bolts 21 which also pass through the bolt holes of two companion flanges 22 and 23 of adjacent pipe sections of a pipe-line whereby, through tightening of the corresponding nuts 24 on the bolts 21, the body 11 can be removably secured in position in any given pipe-line.

In accordance with the present invention, I provide within the cavity 18 defined by the U-shaped body 11 an expandable and contractible insert assembly, which is generally designated by the reference numeral 26. This assembly includes an inner screw annular body 27 having a threaded section 28 on its outer periphery with which is engaged the threaded section 29 of an outer annular screw body 30, such screw bodies being arranged for relative movement. The screw body 27 is provided integrally with a handle 31 which is extended sufficiently, through a stem 32, so as to be grasped and held by a pipe-line operator when jacking the insert assembly to cause pressure to be exerted upon the blind 19 or to relieve pressure from the blind so that it can be removed, when desired. The inner screw body 27 is also so formed as to provide an inwardly extending annular flange 33 thereon in spaced relation to the threaded section 28 thereof to define an annular slot 34 in inner screw body 27 into which the outer annular screw body 30 is movable upon jacking the assembly for one direction of movement of body 30, to relieve the pressure from the blind 19 or, in other words to contract the assembly. The provision of slot 34 in inner screw body 27 in effect provides a cylinder of which the body 30 constitutes a piston, movable in both directions within the cylinder as the assembly 26 is jacked or expanded and contracted to exert pressure upon and to relieve pressure from the blind 19.

As illustrated particularly in Fig. 7 of the annexed drawings, the threaded section 29 of the outer annular screw body 30 is formed with a series of notches or holes 35 in its outer periphery, arranged in spaced relationship and centrally of such periphery. By the provision of these spaced notches 35, a spanner wrench 36 of the type illustrated in Fig. 3, or an equivalent tool, can be selectively inserted in the notches for effectively turning up the outer screw body 30, in either direction of rotation because of the engagement between the threaded sections 28 and 29 of the screw bodies 27 and 30, respectively. In effecting relative movement between the two bodies 27 and 30, the operator conveniently can grasp the lever 31 in one hand while manipulating the body 30 with the wrench 36 with the other hand. If desired, relative movement between the two bodies 27 and 30 can be effected by other means such as pawl and ratchet means or by a system of gearing.

In addition to the foregoing elements, the insert assembly 26 includes a notched inner ring 37 which is formed with an inwardly projecting tongue flange 38 having a straight outer face 39, which mates with the inner face of the inner annular screw body 27, and a streamlined, tapering inner face 40 to permit smooth, free flow of fluid through the bore 41 of a pipe-line, in which the present invention is installed, uninterrupted by shoulders or abutments. The insert assembly 26 also includes an outer ring 42 which overlies the inner ring 37 and which is formed with a radial inwardly directed extension 43 thereon fitting into the notch of the inner ring so that the two rings 37 and 42 move in unison. The outer ring 42 is detachably secured to the outer annular screw body 30 by suitable screws 44 so that when outer body 30 is moved relative to inner annular screw body 27 in the expansion and contraction of the assembly 26, the two rings 37 and 42 are moved with the movement of the body 30. If desired, the three elements consisting of the outer annular screw body 30, the inner notched ring 37 and the outer ring 42 can be formed integrally to afford a single unit rather than three separate elements.

As shown in Fig. 1 of the drawings, the present invention lends itself admirably to pipe-line use for controlling the flow of fluid in the line, i.e., for shutting-off fluid flow completely whenever repairs are to be made in the pipe-line or for other reasons it is desirable to shut off fluid flow, and for permitting full unrestricted flow of fluid through the line. The embodiment of my invention shown in Figs. 1, 2 and 7 is readily installed in the pipe-line and affords a quick change line blind meeting all requirements of devices of this character. To install, it is only necessary to bolt the U-shaped body 11 to the companion flanges 22 and 23 of adjacent pipe-line sections 46 and 47, utilizing the bolts 21 which are passed through the flange holes as well as through the aligned holes of the U-section of the body 11, and then tighten the corresponding nuts 24 of the bolts 21. In order to insure that the body 11 is properly installed, and to insure that the strong-backs 16 and 17 of body 11 do their work, I provide a pair of bearing screws 48 and 49 which are threaded into threaded holes in the strong-backs at their approximate longitudinal centers. Upon fully tightening the screws 48 and 49, their inner ends bear upon the outer surfaces of the flanges 22 and 23 thus effecting the proper alignment of body 11 with relation to the pipe-line sections 46 and 47 and compensating for roughened or uneven outer surfaces of flanges. Suitable set screws 50 are provided for engaging the bearing screws through cushioning pads, not shown, to insure rigidity of the structural relationship between the body 11 and companion flanges 22 and 23.

It is to be especially noted that with my improved combination, the assembly 26 is removably inserted or placed within body 11 as a unit, thus enabling facile replacement or repair of any one or more of the elements constituting the assembly. As illustrated, after the body 11 has been bolted to the flanges 22 and 23, the assembly unit 26 is disposed within cavity 18 of body 11. The spectacle plate 19 is then inserted alongside of the expandable and contractible insert assembly 26 and the latter expanded to exert pressure upon the blind 19. If the pipe-line is to remain open for full fluid flow, the open ring 19' of the spectacle plate is placed within cavity 18 of the body alongside the rings 37 and 42 of the insert assembly 26. As stated, after insertion of the proper end of the spectacle plate 19 in the cavity 18 of the body 11, the assembly 26 is jacked to expand the same and bind the blind 19 under pressure in position. When it is desired to close down the pipe-line or shut off fluid flow for repairs in the line, the insert assembly 26 is jacked in the opposite direction to contract the same and relieve the pressure upon the blind. The spectacle plate or blind 19 is then lifted from body 11, reversed, and then reinserted in the cavity 18 of body 11 with the flat disc 19" thereof disposed across the bore of the pipe-line; it being clear from the drawings that the spectacle plate 19 comprises the open ring 19' at one end, a flat disc 19" at the other end, and a connector strip 20 joining the open ring and flat disc. Thereafter, the assembly 26 is again jacked to expand the same for again exerting pressure upon the blind and retaining it in proper position.

In accordance with the present invention, means are provided for affording effective seal against leakage at all mating surfaces. To this end, inner screw body 27 is formed with an annular groove 51 in its inner surface, and a sealing ring, such as an O ring 52, of resilient material such as rubber, a synthetic rubber or elastic plastic material, is fitted into groove 51. Ring 52 affords a seal between the inner surface of screw body 27 and the mating outer surface 39 of tongue flange 38 on inner ring 37. To protect sealing ring 52 from damage from dirt or other debris that might be entrained in the line fluid, I also provide within an annular groove 53 formed in the inner surface of screw body 27 a scraper ring 54 of metal or other material such as plastic or rubber. Upon to and fro movement of tongue flange 38 by expansion and contraction of insert assembly 26, the scraper ring 54 effectively removes dirt or debris and prevents ingress thereof to sealing ring 52. The inner screw body 27 also is formed with a button-hook cavity 56 in its outer side surface, and an O ring 57 is fitted in such cavity, thus affording an effective seal between the mating surfaces consisting of the inner surface of flange 22 and the outer side surface of inner body 27.

To complete the sealing means, I provide the specially built spectacle plate 19 with sealing rings on opposed faces of both the open ring 19' and the flat disc 19", see Figs. 1 and 2. As shown in Fig. 1, there are provided button-hook cavities 61 and 62 in opposite sides of the open ring 19' and flat disc 19" of the blind and dispose therein O rings 63 and 64, respectively. Thus, an effective seal is provided, on the one hand, between the outer surfaces of the rings 37 and 42 and one side of blind 19, and also an effective seal is provided, on the other hand, between the mating surfaces consisting of the other side of the blind 19 and the inner surface of flange 23 of the pipe-line.

An enlarged detail of the button-hook cavities for retention of the O rings 57, 63 and 64 is shown in Fig. 4 as a preferred form of such cavities. As shown, one mating surface is cut-away, in the general shape of a button-hook on a slanting line 66 which merges with a rounded bottom 67, the latter terminating adjacent the surface in a retaining node 68. Any one of the aforementioned, say the O ring 57, seats on the rounded bottom 67 of the button-hook cavity and is prevented from dislodgment from the cavity by the retaining node 68 adjacent to the cavity bottom. A modified form of O ring cavity is depicted in Fig. 5 of the annexed drawings wherein the cavity is shown as formed to a generally rectangular cross-section except for the bottom thereof which is slightly rounded as at 69 and includes a node 70 at the termination of the rounded section and adjacent to the outer surface of the element in which the cavity is formed. The O ring seats partially in the rounded section 69 of the bottom of such generally rectangular cavity and is restrained against dislodgment from the cavity by the node or lip 70. In all cases the O rings must protrude from the cavities to make contact at mating surfaces and provide leak-proof seals.

While I have illustrated and described the body 11 as consisting of a U-section, together with two strong-backs 16 and 17 bolted to the U-section, it is to be understood that the body 11 can either be constructed as an integral casting of the two strong-backs and the U-section, or such body can consist of a casting of the U-section with one strong-back, and the other strong-back, if desired, detachably connected thereto by means of bolts or eliminated entirely as in the modified embodiment of the invention shown in Fig. 6, or the body 11 can be fabricated of three separate elements comprising the U-section and the two strong-backs, as illustrated herein.

The foregoing description alludes to the exemplification of my present invention as applied to pipe-line sections of a pipe-line. However, the invention has equal application in other environments, such as combined with a valve as illustrated in Fig. 6 which constitutes a modified embodiment of my invention. In this modification, the body 111 is cast with but one instead of two strong-backs and, in lieu of the second strong-back, suitable apertured lugs 101, of which but one is shown in this view, are provided on the valve body 102 for receiving the bolts 14 whereby the body 111 is secured in position by tightening up nuts 15 on bolts 14 between the flange 122 of a pipe section and the flange 123 on valve body 102. The body 111 for this modification is in all other respects similar to the body 11 of the preferred embodiment of the invention illustrated in Figs. 1, 2 and 7, and the insert assembly, not shown, which is removably disposed in body 111 is likewise similar in all respects to the insert assembly 26. The body 111 is removably secured to valve body 102 by means of bolts 121 which pass through the holes of pipe section flange 122 as well as through holes in the U-section of body 111, all not shown, and through holes of the flange 123 on valve body 102; the body 111 being tightened in position by turning up the nuts 124 on bolts 121. Moreover, I employ in the modification of Fig. 6 the specially built spectacle plate or blind 19 as used in the preferred embodiment of the invention.

In operation, when the hand-wheel 103 of the valve 102 is turned to close the valve and shut off fluid flow, the disc of the spectacle plate or blind is inserted into the cavity of the body 111, and the insert assembly jacked to expand the assembly for exerting pressure upon the blind affording thereby a positive shut-off. When it is desired to open the line for full fluid flow through the valve 102, the insert assembly of body 111 is contracted to relieve the pressure on the blind, and the blind is then reversed to place the open ring section thereof into the cavity, thereby conditioning the unit for full fluid flow through the valve and pipe section or conduit associated therewith.

While in Fig. 6 of the drawings I have illustrated one modification of the present invention, it is to be understood that the invention is equally applicable in other environments, such as in line, tank, sump or other fittings involving fluid flow.

As particularly shown in Figs. 1, 2, 6 and 7 of the annexed drawings, additional means is provided to prevent rust or corrosion of parts, or other damage to the elements from dirt and debris. This additional means comprises a cover plate 76 which is hingedly connected to cross-bar 13 of the U-shaped body 11, and 111 in the modification of Fig. 6, and which overlies the insert assembly 26 of the U-shaped body when in closed position. A pair of apertured lugs 77 and 78 are provided in spaced relationship on one end of cover plate, such lugs encompassing an apertured lug 79 formed on the cross-bar 12 of the U-shaped body. By passing the hasp of a lock, all not shown, through the aligned apertures of lugs 77, 78 and 79, see Fig. 2, the cover plate 76 can be locked in closed position to keep out rain, sleet and snow, as well as foreign matter, from the cavity of the U-shaped body, thus protecting the parts from rust and corrosion or other damage. In lieu of a lock, a conventional car seal, not shown, can be employed to maintain the cover plate 76 in closed position. With either a lock or a car seal for latching the cover plate, the same protects the operation of the blind by unauthorized personnel.

I claim:

1. A quick change line blind comprising, in combination with opposed flanges of a pair of adjacent pipe sections, a U-shaped integral body detachably connected to said opposed flanges to hold said flanges apart at a fixed distance thus defining a cavity therebetween, a line blind spectacle plate selectively and removably disposed in said cavity alongside one of said opposed flanges, an expandable and retractible assembly removably disposed as a unit in said cavity between said spectacle plate and the other of said opposed flanges with one end face of said assembly engaging said other flange; said assembly having a bore therethrough corresponding to the bore of the pipe sections, means for jacking said assembly in one linear direction to exert pressure upon one side of said spectacle plate to urge the plate into engagement with said one flange; jacking of said assembly in the opposite linear direction relieving pressure upon said spectacle plate to permit removal thereof from said cavity, and sealing means at the joints of all mating surfaces of said flanges and said assembly and said spectacle plate for effectively sealing the line blind against leakage.

2. A quick change line blind, comprising, in combination with opposed flanges of a pipe section and a valve body, a U-shaped integral body detachably connected to said flanges to hold said flanges apart at a fixed distance thus defining a cavity therebetween, a line blind spectacle plate selectively and removably disposed in said cavity alongside one of said opposed flanges, an expandable and retractible insert assembly removably disposable as a unit in said cavity between said spectacle plate and the other of said opposed flanges; said assembly having a bore therethrough corresponding to the bore of said pipe section and said valve body, means for expanding and retracting said insert assembly for exerting pressure upon one side of said spectacle plate to urge the plate into engagement with the flange of said valve body; relief of pressure upon said spectacle plate by retraction of said insert assembly permitting removal of said spectacle plate from said cavity, and sealing means at the joints of all meeting surfaces of said flanges and said assembly and said spectacle plate for effectively sealing the blind against leakage.

3. A quick change line blind comprising, in combination with opposed flanges of adjacently disposed conduits in which fluid is conveyed, a U-shaped integral body detachably connected to said opposed flanges to hold said flanges apart at a fixed distance, thus defining a cavity therebetween, a line blind spectacle plate selectively and removably disposed in said cavity adjacent to one flange of said opposed flanges, an expandable and retractible insert assembly removably disposed as a unit in said cavity between said spectacle plate and the other of said opposed flanges; said insert assembly having a bore therethrough corresponding to the bore of said conduits and comprising an inner annular screw body, an outer annular screw body in meshing engagement with said inner screw body, and means on said outer screw body for effecting relative movement in two opposite linear directions between said screw bodies whereby pressure may be exerted upon and relieved from said spectacle plate to hold said spectacle plate under pressure engagement with said one flange as well as to permit disengagement of said spectacle plate from said one flange, and sealing means at the joints of all mating surfaces of said assembly and said flanges and said spectacle plate for effectively sealing the blind against leakage.

4. A quick change line blind comprising, in combination with companion flanges of adjacent pipe-line sections, a separator body detachably connected to said flanges and defining a cavity therebetween for the selective reception of a line blind, an insert assembly removably disposable in said cavity alongside said line blind; said insert assembly comprising an inner annular screw body having a threaded section on its outer periphery, an outer annular screw body having a threaded section on its inner periphery mating with the screw section of said inner screw body; said outer screw body having a plurality of notches in its outer periphery arranged in spaced relationship for the selective reception of a wrench whereby said outer screw body may be turned to effect relative movement in two opposite directions to exert pressure upon and relieve pressure from said line blind, and an inwardly directed tongue flange on said outer screw body underlying the inner periphery of said inner screw body; said inner screw body containing a scraper ring on its inner periphery for removing dirt and other foreign material and preventing ingress thereof into said assembly, a first sealing means retained in the inner periphery of said inner screw body to seal the mating surfaces of said inner screw body and said tongue flange of said outer screw body against leakage, a second sealing means in the side of said inner screw body to seal the mating surfaces of said side of said inner screw body and one of said flanges against leakage, third and fourth sealing means in opposite sides of said line blind to seal the joint between one side of said blind and said screw bodies as well as the joint between the other side of said blind and the other of said flanges against leakage, and a cover plate hingedly connected to said separator body to prevent ingress of the elements as well as debris into said cavity of said separator body.

5. In a quick change line blind, in combination with companion flanges of two adjacent pipe-line sections, a U-shaped body detachably connected to said flanges and defining a cavity between said sections; said body comprising a U-section, a pair of cross-bars on opposite ends of said U-section, and a pair of strong-backs connecting the ends of said cross-bars; said strong-backs supporting said flanges against hydrostatic pressure in the pipe-line in service.

6. In a quick change line blind, in combination with companion flanges of two adjacent pipe-line sections, a U-shaped body detachably connected to said flanges and defining a cavity between said sections; said body comprising a U-section, a pair of cross-bars on opposite ends of said U-section, a pair of strong-backs connecting the ends of said cross-bars, and bearing screws piercing each of said strong-backs and engaging said flanges to insure proper bearing surface between said body and said flanges.

7. In combination with a pipe line including pipe sections and pipe flanges thereon adapted to be releasably secured to each other to interconnect said pipe sections, a quick change line blind interposed between said pipe flanges and comprising a body rigidly connected to said flanges to hold the flanges apart and to define a cavity therebetween, a spectacle plate removably disposed within said cavity with one face of the spectacle plate in direct engagement with one of said pipe flanges, and expandable means in direct sealing engagement with the opposite face of said spectacle plate and with the other of said pipe flanges for releasably holding said spectacle plate in sealing engagement with said one of said pipe flanges.

8. A quick change line blind comprising, in combination with companion flanges of adjacent pipe line sections, a body detachably connected to said flanges to hold said flanges apart and defining a cavity therebetween for the selective reception of a line blind spectacle plate, movable means in the cavity of said body for releasably holding a spectacle plate in said cavity in sealing engagement with one of said flanges, and a scraper ring on said means for preventing ingress of dust and other foreign material into said cavity.

9. In a quick change line blind usable in combination with companion flanges of adjacent pipe line sections, a spectacle plate, movable means for releasably holding said spectacle plate in sealing engagement with one of said flanges of said pipe line sections, and a scraper ring on said means for preventing ingress of dirt and other foreign material from the bores of said pipe line sections which otherwise would disturb the operation of said movable means and would disrupt the sealing engagement of said spectacle plate with said one flange of said flanges.

10. A quick change line blind usable in combination with companion flanges of adjacent pipe sections, comprising a spectacle plate removably positioned adjacent a first one of said companion flanges, and an expander element separate from said spectacle plate and interposed between said spectacle plate and the other of said companion pipe flanges; expansion of said element urging said spectacle plate into direct sealing engagement with said first one of said companion pipe flanges.

References Cited in the file of this patent

UNITED STATES PATENTS

| | | |
|---|---|---|
| 2,214,959 | Hamer | Sept. 17, 1940 |
| 2,271,282 | Young | Jan. 27, 1942 |
| 2,278,849 | Hamer | Apr. 7, 1942 |
| 2,340,499 | Zachow | Feb. 1, 1944 |
| 2,558,247 | Hamer | June 26, 1951 |
| 2,600,497 | Hamer | June 17, 1952 |
| 2,709,455 | Greenwood | May 31, 1955 |

FOREIGN PATENTS

| | | |
|---|---|---|
| 177,010 | Switzerland | Aug. 1, 1935 |